(12) United States Patent
Gu

(10) Patent No.: US 9,709,300 B2
(45) Date of Patent: Jul. 18, 2017

(54) INFLATABLE LIGHT WEIGHT SOLAR COOKER

(71) Applicant: Bingwu Gu, Elk Grove, CA (US)

(72) Inventor: Bingwu Gu, Elk Grove, CA (US)

(*) Notice: Subject to any disclaimer, the term of this patent is extended or adjusted under 35 U.S.C. 154(b) by 413 days.

(21) Appl. No.: 14/504,998

(22) Filed: Oct. 2, 2014

(65) Prior Publication Data

US 2015/0020795 A1  Jan. 22, 2015

Related U.S. Application Data

(60) Provisional application No. 61/887,576, filed on Oct. 7, 2013.

(51) Int. Cl.

| F24J 2/02 | (2006.01) |
|---|---|
| A47J 33/00 | (2006.01) |
| F24J 2/08 | (2006.01) |
| A47J 36/26 | (2006.01) |

(52) U.S. Cl.
CPC ............. *F24J 2/02* (2013.01); *A47J 33/00* (2013.01); *A47J 36/26* (2013.01); *F24J 2/08* (2013.01); *Y02B 40/18* (2013.01); *Y02E 10/40* (2013.01)

(58) Field of Classification Search
CPC .......... F24J 2/02; F24J 2/08; F24J 2/52; F24J 2/125; F24J 2/145; F24J 2/15; A47J 36/26; A47J 33/00; Y02E 10/40; Y02B 40/18
See application file for complete search history.

(56) References Cited

U.S. PATENT DOCUMENTS

| 4,114,592 A | 9/1978 | Winston |
| 5,893,360 A * | 4/1999 | Stoumen ............... F24J 2/02 |
| | | 126/624 |
| 6,897,832 B2 | 5/2005 | Essig et al. |
| 2002/0170555 A1 | 11/2002 | Stouman |
| 2010/0218806 A1 | 9/2010 | Arab et al. |
| 2011/0253883 A1 | 10/2011 | Lin et al. |

FOREIGN PATENT DOCUMENTS

| CN | 275856 Y | 2/2006 |
| DE | 4009754 A1 | 1/1991 |
| WO | 20100134069 A1 | 11/2010 |

OTHER PUBLICATIONS

Sponheim, (last listed editor), Balloon Solar Cooker, Jun. 27, 2008 (last listed edit date), http://web.archive.org/web/20081110192822/http://solarcooking.wikia.com/wiki/Balloon_Solar_Cooker.

* cited by examiner

*Primary Examiner* — Alfred Basichas
(74) *Attorney, Agent, or Firm* — Gerald R Prettyman

(57) ABSTRACT

Disclosed are systems and methods to concentrate sunlight with inflatable enclosures to heat substances, including fluids and for cooking, and to provide concentrated sunlight for other uses. The system includes an inflatable sunlight concentrator (upper balloon), an inflatable cooking housing (bottom balloon), and a cooking container. When inflated, the upper balloon has a substantially cone-shape and concentrates sunlight towards the bottom balloon. The bottom balloon may be of various shapes and may concentrate sunlight towards the cooking space. Each balloon is less than two ounces and can be folded into a small pocket-sized package when it is deflated. The cooking space may be a thermal bag, a box, or an insulated space.

16 Claims, 10 Drawing Sheets

INFLATABLE LIGHT WEIGHT SOLAR COOKER

CROSS-REFERENCE TO RELATED APPLICATION

This application claims the benefit of priority of U.S. Provisional Patent Application 61/887,576 filed Oct. 7, 2013 and titled "Inflatable Light Weight Solar Cooker," the disclosure of which is incorporated by reference. This application is related to U.S. Pat. No. 8,339,709 issued Dec. 25, 2012 and titled "Low numerical aperture (low-NA) solar lighting system." This application is related to U.S. Pat. No. 8,184,372 issued May 22, 2012 and titled "Low numerical aperture (low-NA) solar lighting system." This application is related to U.S. Non-Provisional patent application Ser. No. 13/333,841 filed Dec. 21, 2011 and titled "Two Axis Tracking Fresnel Lens Solar Oven and Stove." This application is related to U.S. Non-Provisional patent application Ser. No. 13/333,854 filed Dec. 21, 2011 and titled "Two Axis Tracking Parabolic Reflector Solar Oven and Stove."

STATEMENT REGARDING FEDERALLY SPONSORED RESEARCH OR DEVELOPMENT

Not Applicable

BACKGROUND OF THE INVENTION

Field of Invention

This invention relates to the field of solar energy, more specifically, relates to the direct use of solar radiation for cooking, heating, and other thermal application through a balloon solar concentrator.

Description of Related Art

Many people need energy for outdoor cooking and heating. For example, people work at a farm, at construction site, at a park, at a mine need portable energy source for cooking. People go outside camping, hiking, or boating would also appreciate a compact light weight cooking device. Most time propane, LPG, wood, grass, or other fuel is used to provide the needed energy. However, sometimes fuels are expensive, not convenient to carry, or difficult to find. Burning fuels increases green house gas emission. It also emits carbon black and other pollutants. An inflatable, extremely light weight, easy to carry, very compact solar cooker may be a potentially viable solution for outdoor food preparation, water pasteurizing, space heating, and other needs of process heat. The other group of customers are interested in very compact and light weight solar cookers because they want to store or carry the solar cooker so that they are more prepared for emergency, where limited fuel, energy, and electric power are available.

SUMMARY OF THE INVENTION

Disclosed is an Inflatable Light Weight Solar Cooker (100) comprising an Inflatable Upper Chamber (205), a Lower Chamber (210), and a Cooking Chamber (215).

In some embodiments, an Inflatable Upper Chamber (300) comprises an inflatable upper chamber substantially transparent refractive upper lens (305), a substantially conical outer wall (310), a substantially reflective inner wall (315), a substantially transparent lower lens (320), and at least one gas passage nozzle (325).

In some embodiments, the inflatable upper chamber substantially transparent refractive upper lens (305) comprises a flexible material selected from the group consisting of polyester film, polyvinyl film, polyethylene film, and polyethylene terephthalate film.

In some embodiments, the substantially conical outer wall (310) comprises a flexible material selected from the group consisting of polyester film, polyvinyl film, polyethylene film, and polyethylene terephthalate film.

In some embodiments, the substantially reflective inner wall (315) comprises a flexible material selected from the group consisting of reflective polyester film, reflective polyvinyl film, and aluminized coating on a flexible substrate.

In some embodiments, the substantially transparent lower lens (320) comprises a flexible material selected from the group consisting of polyester film, polyvinyl film, polyethylene film and polyethylene terephthalate film.

In some embodiments, the Inflatable Upper Chamber (300) has an Inflatable Upper Chamber solar radiation entrance width 'a' (405), and an Inflatable Upper Chamber solar radiation exit width 'b' (410), wherein the Inflatable Upper Chamber solar radiation entrance width 'a' is less than three times the Inflatable Upper Chamber solar radiation entrance width 'b'.

In some embodiments, the Lower Chamber (500) comprises an inflatable outer wall (505), a inner chamber (510) and at least one gas passage nozzle (515) and has a substantially cylindrical shape.

In some embodiments, there is a Lower Chamber transparent cover (520) adjacently between Inflatable Upper Chamber (300) and the Lower Chamber (500).

In some embodiments, the Lower Chamber (600) is inflatable and comprises a outer surface (605), an at least partially open inner chamber (610) and at least one gas passage nozzle (615) and has a semi-circular toroidal shape. In some embodiments, the outer surface is reflective.

In some embodiments, the Lower Chamber (700) is inflatable and comprises an outer surface (705), an at least partially open inner chamber (710) and at least one gas passage nozzle (715) and has a toroidal shape.

In some embodiments, there is a supporting stand (825) adjacent to the Inflatable Upper Chamber (805) for providing stability of the Inflatable Upper Chamber (805) with regard to the Lower Chamber (810).

In some embodiments, there is a supporting strap (830) affixing a supporting stand (825) to the Inflatable Upper Chamber (805).

In some embodiments, there is a cowling with inner reflective surface (910) adjacently between the Inflatable Upper Chamber (905) and the Lower Chamber (915).

Also disclosed is a method for delivering thrice-concentrated sunlight into a cooking chamber.

DETAILED DESCRIPTION OF THE INVENTION

Figure 1:
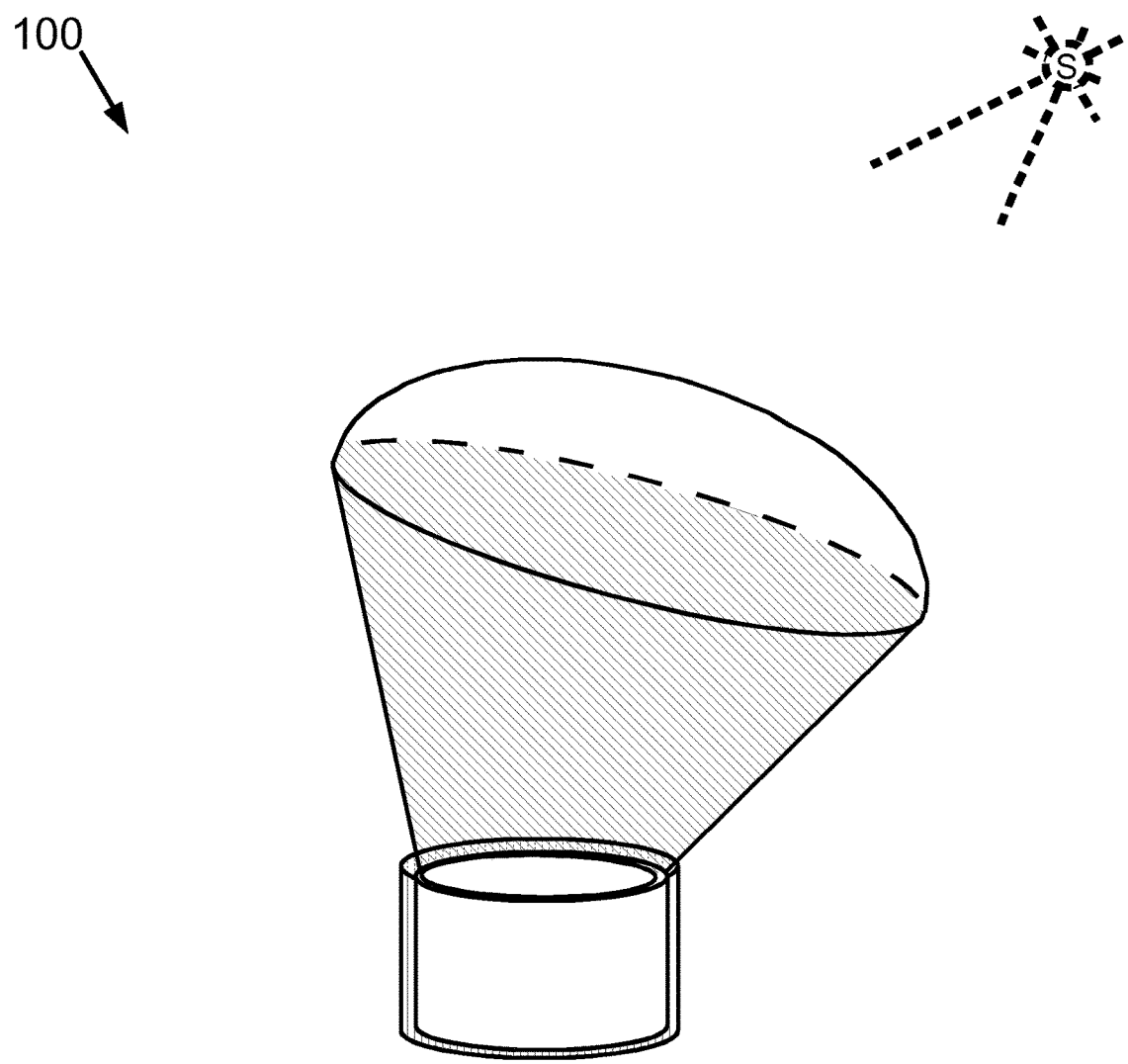
FIG. 1 shows a system for an Inflatable Light Weight Solar Cooker (100) with a Sun (S). Additional figures and descriptions in this disclosure detail the structure and function of the Inflatable Light Weight Solar Cooker (100). Also shown is a Sun (S).

FIG. 1 shows a system for an Inflatable Light Weight Solar Cooker (100) with a Sun (S). Additional figures and descriptions in this disclosure detail the structure and function of the Inflatable Light Weight Solar Cooker (100). Also shown is a Sun (S).

Figure 2:
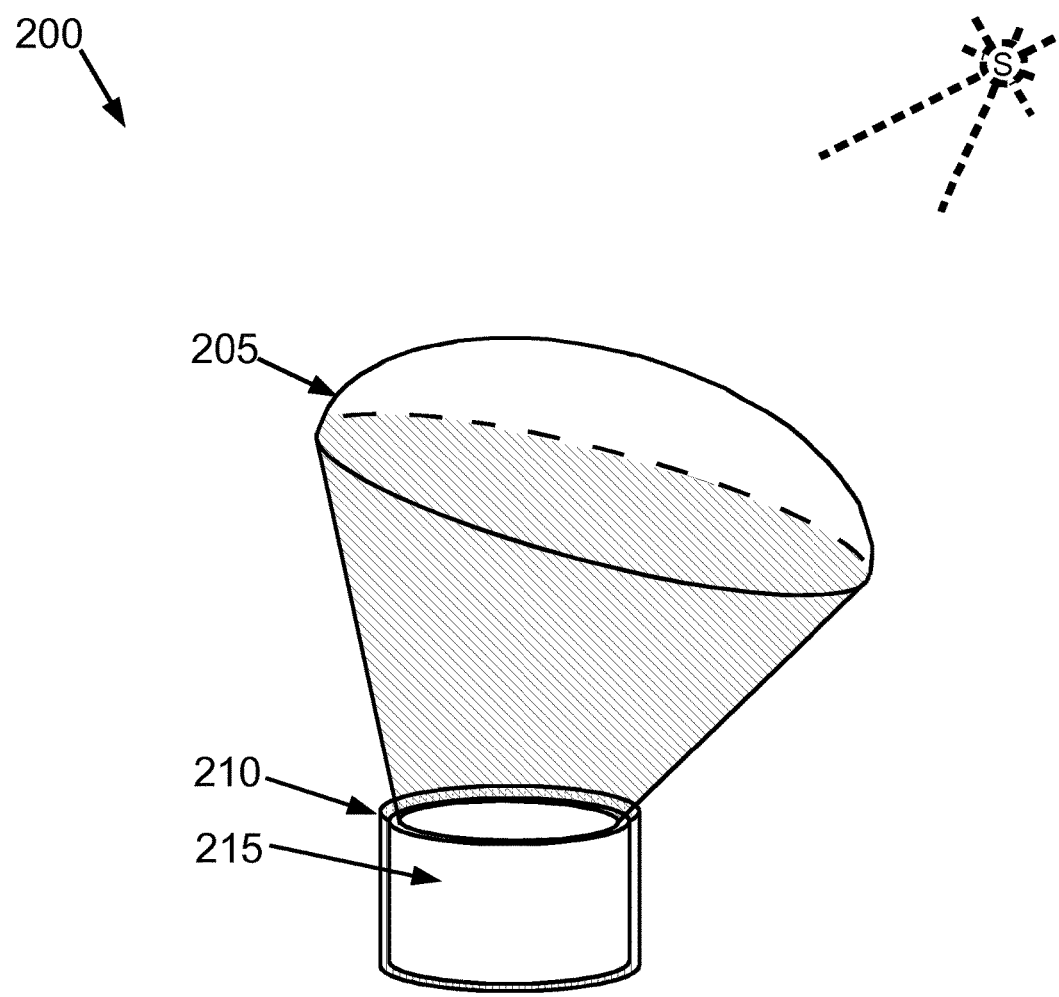
FIG. 2 shows certain components of an Inflatable Light Weight Solar Cooker (200). Shown in FIG. 2 are an Inflatable Light Weight Solar Cooker (200) comprising an Inflatable Upper Chamber (205), a Lower Chamber (210), and a Cooking Chamber (215). Also shown is a Sun (S).

FIG. 2 shows certain components of an Inflatable Light Weight Solar Cooker (200). Shown in FIG. 2 are an Inflatable Light Weight Solar Cooker (200) comprising an Inflatable Upper Chamber (205), a Lower Chamber (210), and a Cooking Chamber (215). Also shown is a Sun (S).

Figure 3:
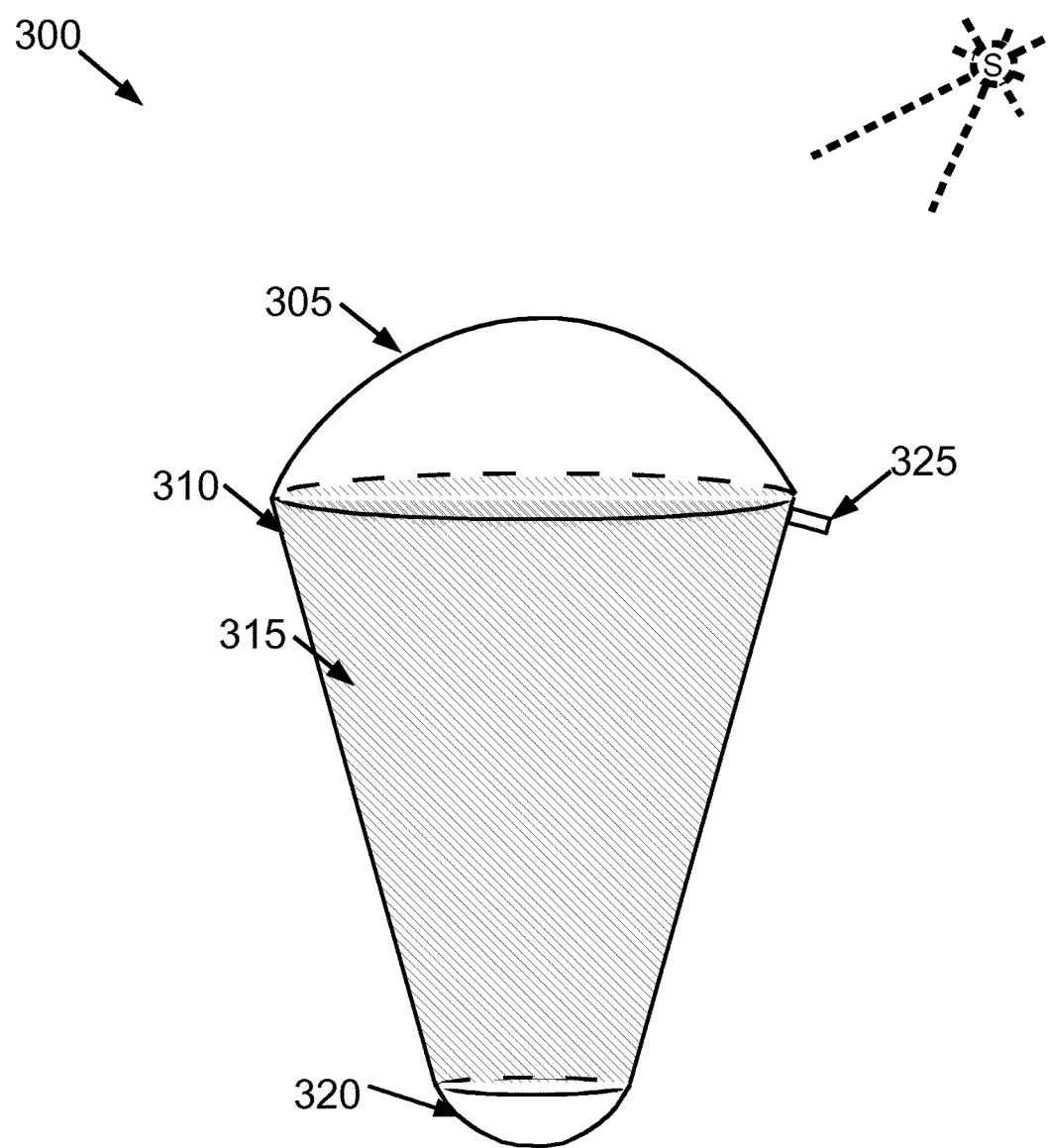
FIG. 3 shows certain details of an Inflatable Upper Chamber (300). Shown in FIG. 3 are an inflatable upper chamber substantially transparent refractive upper lens (305), a substantially conical outer wall (310), a substantially reflective inner wall (315), a substantially transparent lower lens (320), and at least one gas passage nozzle (325).

As will be described, the Inflatable Upper Chamber (205) functions as a three-stage primary solar concentrator so that a majority of sunlight striking the Inflatable Upper Chamber (205) is concentrated through the Inflatable Light Weight Solar Cooker (100). In some embodiments, the solar radiation from the sun (S) could be concentrated to as much as ten suns into the Cooking Chamber (215). FIG. 3 provides additional details about the structure and function of the Inflatable Upper Chamber (205).

The Lower Chamber (210) functions as an additional two-stage solar concentrator for the Inflatable Light Weight Solar Cooker (100) to (a) direct solar radiation into the Cooking Chamber (215) that exits the Inflatable Upper Chamber (205) but does not enter the Cooking Chamber (215), and (b) functions as a barrier against convective heat escape by trapping hot air within the Lower Chamber (210). The Lower Chamber (210) thus assures more heat is delivered to the Cooking Chamber (215). FIG. 5 provides additional details about the structure and function of the Lower Chamber (210).

FIG. 3 shows certain details of an Inflatable Upper Chamber (300). Shown in FIG. 3 are an inflatable upper chamber substantially transparent refractive upper lens (305), a substantially conical outer wall (310), a substantially reflective inner wall (315), a substantially transparent lower lens (320), and at least one gas passage nozzle (325).

The inflatable upper chamber substantially transparent refractive upper lens (305) receives sunlight and refracts the sunlight into the interior of the Inflatable Upper Chamber (300). This is the first stage of the Inflatable Upper Chamber (300) as a three-stage primary solar concentrator for the Inflatable Light Weight Solar Cooker (100). The inflatable upper chamber substantially transparent refractive upper lens (305) must be sufficiently pliable and have sufficient tensile strength to be inflatable. In addition, the inflatable upper chamber substantially transparent refractive upper lens (305) must be substantially transparent to allow sunlight to pass through and into the interior of the Inflatable Upper Chamber (300). Lastly, the inflatable upper chamber substantially transparent refractive upper lens (305) must have at least a marginal refractive index to refract sunlight into the interior of the Inflatable Upper Chamber (300). In some embodiments, the inflatable upper chamber substantially transparent refractive upper lens (305) may be clear polyester film, including that sold under the Mylar® brand.

The substantially conical outer wall (310) is a structural component providing a conical shape to the Inflatable Upper Chamber (300), and may be opaque, partially transparent, or wholly transparent. The substantially conical outer wall (310) similarly must be sufficiently pliable and have sufficient tensile strength to be inflatable. In some embodiments, the substantially conical outer wall (310) may also be polyester film. The conical shape of the substantially conical outer wall (310) is one-half of the second stage of the Inflatable Upper Chamber (300) as a three-stage primary solar concentrator for the Inflatable Light Weight Solar Cooker (100).

The substantially reflective inner wall (315) reflects sunlight striking the substantially reflective inner wall (315) from the inflatable upper chamber substantially transparent refractive upper lens (305) so that the sunlight is directed further along the substantially conical outer wall (310). In some embodiments, the substantially reflective inner wall (315) may comprise a polyester film, including Mylar®, metalized or with a reflective coating, film or other reflective structure integrated or affixed to fulfill the reflective function. In some embodiments, the substantially reflective inner wall (315) may comprise a polyethylene (PE) film or polyethylene terephthalate (PET) film.

In some embodiments, the substantially reflective inner wall (315) may comprise an aliphatic polyamide film, including nylon, metalized or with a reflective coating, film or other reflective structure integrated or affixed to fulfill the reflective function.

In some embodiments, the substantially reflective inner wall (315) may comprise an aluminum coating on a flexible substrate.

In some embodiments, the substantially reflective inner wall (315) may be a polyvinyl chloride (PVC) reflective film.

In some embodiments, the substantially reflective inner wall (315) may be integrated with the substantially conical outer wall (310). In some embodiments, the substantially reflective inner wall (315) may be subsurface, i.e., a layer, between the substantially conical outer wall (310) and a substantially transparent layer within the Inflatable Upper Chamber (300).

The substantially reflective inner wall (315) is the second-half of the second stage of the Inflatable Upper Chamber (300) as a three-stage primary solar concentrator for the Inflatable Light Weight Solar Cooker (100).

The substantially reflective inner wall (315) must be sufficiently pliable and have sufficient tensile strength to be inflatable.

The substantially transparent lower lens (320) receives sunlight from the substantially reflective inner wall (315) and the inflatable upper chamber substantially transparent refractive upper lens (305) and refracts the sunlight into the adjacent structures.

The substantially transparent lower lens (320) is the third stage of the Inflatable Upper Chamber (300) as a three-stage primary solar concentrator for the Inflatable Light Weight Solar Cooker (100). The substantially transparent lower lens (320) must be substantially transparent to allow sunlight to pass out of the Inflatable Upper Chamber (300). In some embodiments, the substantially transparent lower lens (320) has a refractive index greater than one.

Figure 4:
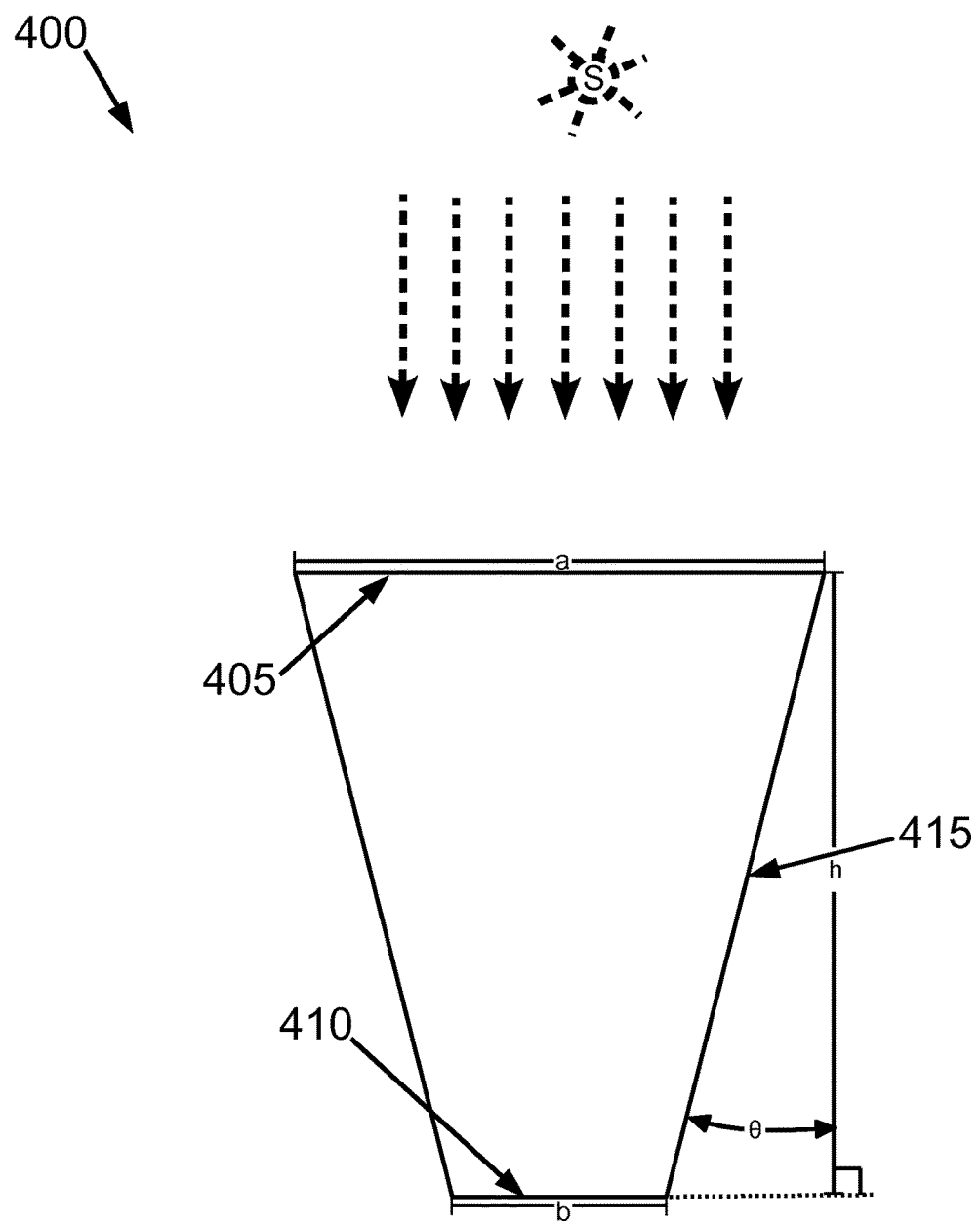
FIG. 4 provides details about a mathematical relationship of the shape of the Inflatable Upper Chamber (400) to have a high optical efficiency. For purposes of FIG. 4, the Inflatable Upper Chamber (400) is presumed to have a true trapezoid shape.

As described in FIG. 4, there is a mathematical relationship of the substantially transparent lower lens (320) to the inflatable upper chamber substantially transparent refractive upper lens (305). In simplest terms, the inflatable upper chamber substantially transparent refractive upper lens (305) is about three times wider than the substantially transparent lower lens (320). This mathematical relationship is not required for use, but rather, provides for optimum efficiency of the Inflatable Light Weight Solar Cooker (200).

The substantially transparent lower lens (320) must be sufficiently pliable and have sufficient tensile strength to be inflatable.

In some embodiments, the substantially transparent lower lens (320) may be clear polyester film, including that sold under the Mylar® brand.

Altogether, the inflatable upper chamber substantially transparent refractive upper lens (305), the substantially conical outer wall (310) and the substantially transparent lower lens (320) make the Inflatable Upper Chamber (300) function as a cone shape sunlight concentrator.

The at least one gas passage nozzle (325) is a port for the passage of a transparent gas into, out of, or into and out of the Inflatable Upper Chamber (300) so the Inflatable Upper Chamber (300) may be inflated, deflated, or inflated and deflated. In some embodiments, there may be one gas passage nozzle (325). Other embodiments may have a plurality of gas passage nozzles (325).

A plurality of gas passage nozzles (325) may be required in an embodiment in which one or more of the inflatable upper chamber substantially transparent refractive upper lens (305), the substantially conical outer wall (310), the substantially reflective inner wall (315), or the substantially transparent lower lens (320) is inflated either separated, or as a separate set from one or more of the structures of the Inflatable Upper Chamber (300).

The at least one gas passage nozzle (325) is flexible in some embodiments so that all structures of the Inflatable Upper Chamber (300) might be made of the same material.

The at least one gas passage nozzle (325) is flexible in some embodiments so that the Inflatable Upper Chamber (300) might be deflated and compressed for storage and not risking damage, which might occur if the at least one gas passage nozzle (325) were a non-flexible material.

FIG. 4 provides details about a mathematical relationship of the shape of the Inflatable Upper Chamber (400) to have a high optical efficiency. For purposes of FIG. 4, the Inflatable Upper Chamber (400) is presumed to have a true trapezoid shape.

Shown in FIG. 4 as a presumably true trapezoid, is a Inflatable Upper Chamber solar radiation entrance (405), which is dimensioned as 'a'. In the FIG. 3 Inflatable Upper Chamber (300), the inflatable upper chamber substantially transparent refractive upper lens (305) is connected to the Inflatable Upper Chamber (300) along this side.

Also shown in FIG. 4 is a Inflatable Upper Chamber solar radiation exit (410) which is dimensioned as 'b'. In the FIG. 3 Inflatable Upper Chamber (300), the substantially transparent lower lens (320) is connected to the Inflatable Upper Chamber (300) along this side. As sides of a true trapezoid, the Inflatable Upper Chamber solar radiation entrance (405) and the Inflatable Upper Chamber solar radiation exit (410) are parallel to each other.

Also shown in FIG. 4 are sides (415) of the Inflatable Upper Chamber which are dimensioned as 'h' and form an angle Θ ("theta") against a right angle formed by side a, or side b and a perpendicular line to side a, or side b.

Based on this geometry, angle Θ has a tangent of $$(a-b)/(2*h) \tag{1}$$

Since every time the sunlight reflects at the inner surface of the upper balloon, a percentage of solar energy is lost. An optimized solar concentrator will have all sunlight entering "a" reach exit "b" with minimal number of reflection. That is:

$$h*\tan(2*\Theta)>(b+a)/2 \tag{2}$$

From trigonometric identities and formulas, we have:

$$\tan(2\Theta)=2*\tan(\Theta)/(1-\tan(\Theta)*\tan(\Theta)) \tag{3}$$

Combining equations (1), (2), and (3), we have:

$$h>[(a-b)/2]*[(a+b)/(3b-a)]^{0.5} \tag{4}$$

For the Inflatable Upper Chamber (300) to have a high optical efficiency, height h should satisfy equation (4) to maximize concentrating the sunlight entering the Inflatable Upper Chamber solar radiation entrance (405) and leaving the Inflatable Upper Chamber solar radiation exit (410).

In effect, side 'a', the dimension of the Inflatable Upper Chamber solar radiation entrance (405) should not be greater than three times of dimension "b", the Inflatable Upper Chamber solar radiation exit (410), i.e., $$a<3b \tag{4}$$

Figure 5A:
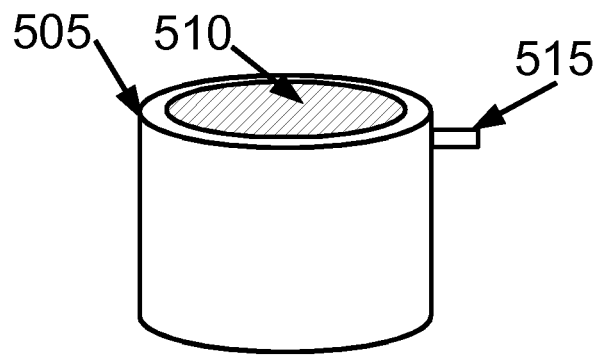
FIGS. 5a and 5b shows an embodiment of an Lower Chamber (500). In this embodiment, the Lower Chamber (500) models a hollow cylinder comprising an inflatable outer wall (505), a inner chamber (510) and at least one gas passage nozzle (515).
Figure 5B:
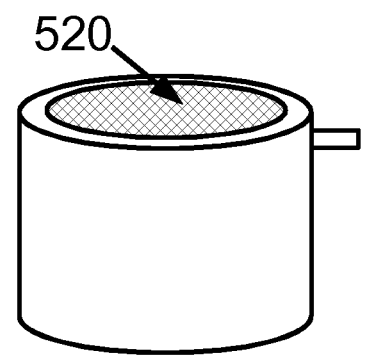

FIGS. 5a and 5b shows an embodiment of an Lower Chamber (500). In this embodiment, the Lower Chamber (500) models a semi-hollow cylinder comprising an inflatable outer wall (505), a inner chamber (510) and at least one gas passage nozzle (515).

The inflatable outer wall (505) provides support for the Lower Chamber (500) to stage semi-right when inflated. As with the Upper Chamber, the inflatable outer wall (505) may be polyester film, including that sold under the Mylar® brand. In other embodiments, the inflatable outer wall (505) might be a polyvinyl chloride (PVC) film, polyester film, polyethylene (PE) film, polyethylene terephthalate (PET) film. The inflatable outer wall (505) could be opaque, transparent, or have partial transparency.

The Lower Chamber (500) may serve a plurality of purposes. In some embodiments, the Lower Chamber (500) is a secondary solar concentrator to the Inflatable Upper Chamber. In these embodiments, the inner chamber (510)

comprises a reflective inner surface. As with the Upper Chamber, the reflective inner surface may be clear polyester film, including that sold under the Mylar® brand. In other embodiments, the reflective inner surface might be reflective polyvinyl chloride (PVC) film. In other embodiments, the reflective inner surface might be aluminum metalized coating.

The inner chamber (510) also serves a holding reservoir for cooking or heating foodstuff, heating beverages, or both. In some embodiments, the Lower Chamber is integrated with the cooking chamber. While the foodstuff or beverage would typically be placed in a separate container to preserve cleanliness of the foodstuff or beverage, the inner chamber (510) might also serve as a container, for which the Lower Chamber (500) might have a sealed bottom (not shown).

The at least one gas passage nozzle (515) is a port for the passage of a transparent gas into, out of, or into and out of the Lower Chamber (500) so the Lower Chamber (500) may be inflated, deflated, or inflated and deflated. In some embodiments, there may be one gas passage nozzle (515). Other embodiments may have a plurality of gas passage nozzles (515).

The at least one gas passage nozzle (515) is flexible in some embodiments so that all structures of the Lower Chamber (500) might be made of the same material.

The at least one gas passage nozzle (515) is flexible in some embodiments so that the Lower Chamber (500) might be deflated and compressed for storage and not risking damage, which might occur if the at least one gas passage nozzle (515) were a non-flexible material.

In some embodiments, the Lower Chamber (500) may also comprise a Lower Chamber transparent cover (520) for trapping heated air within the Lower Chamber (500). In this embodiment, the Lower Chamber (500) is a two-stage solar concentrator. In some embodiments, the Lower Chamber transparent cover (520) may be clear polyester film, including that sold under the Mylar® brand.

Figure 6:
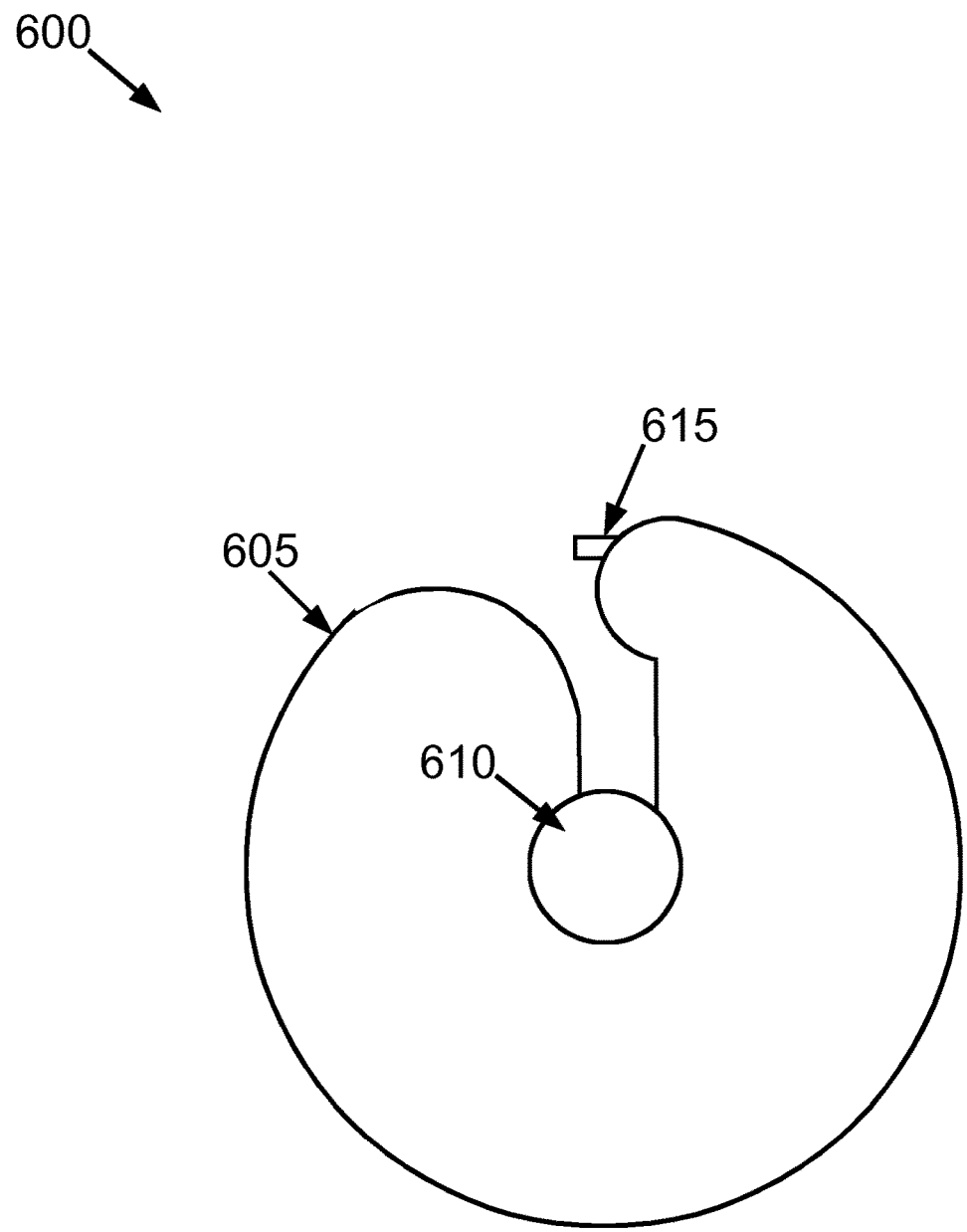
FIG. 6 shows another embodiment of an Lower Chamber (600). In this embodiment, the Lower Chamber (600) has a semi-circular toroidal shape and comprises an outer surface (605), an at least partially open inner chamber (610) and at least one gas passage nozzle (615).

FIG. 6 shows another embodiment of an Lower Chamber (600). In this embodiment, the Lower Chamber (600) models a toroid semi-circle comprising an outer surface (605), an at least partially open inner chamber (610) and at least one gas passage nozzle (615).

This embodiment of the Lower Chamber (600) presents certain advantages in that the toroid semi-circle shape, when deflated, folds into a smaller size than some other shapes.

In this embodiment, the Lower Chamber (600) may cradle a food container and provide a base for the Inflatable Upper Chamber as well. In some embodiments, the outer surface (605) may be a polyester film, including that sold under the Mylar® brand. In other embodiments, the outer surface (605) might be polyvinyl chloride (PVC) film.

In some embodiments, the outer surface (605) may be clear. In some embodiments, the outer surface (605) may be reflective. In other embodiments, the outer surface (605) might be aluminum metalized coating. If reflective, the Lower Chamber (600) would assist in heating the food or beverage within the Inflatable Light Weight Solar Cooker.

The at least partially open inner chamber (610) may be small or large as designed to accommodate whatever cooking container is used, if one is used. In some embodiments, the at least partially open inner chamber (610) may have a sealed bottom so that a flexible cooking container, perhaps made of a flexible plastic, such as a polyethylene bag, or even a paper bag, may be placed on the at least partially open inner chamber (610) for heating and cooking.

The at least one gas passage nozzle (615) is a port for the passage of a transparent gas into, out of, or into and out of the Lower Chamber (600) so the Lower Chamber (600) may be inflated, deflated, or inflated and deflated. In some embodiments, there may be one gas passage nozzle (615). Other embodiments may have a plurality of gas passage nozzles (615).

The at least one gas passage nozzle (615) is flexible in some embodiments so that all structures of the Lower Chamber (600) might be made of the same material.

The at least one gas passage nozzle (615) is flexible in some embodiments so that the Lower Chamber (600) might be deflated and compressed for storage and not risking damage, which might occur if the at least one gas passage nozzle (615) were a non-flexible material.

Figure 7:
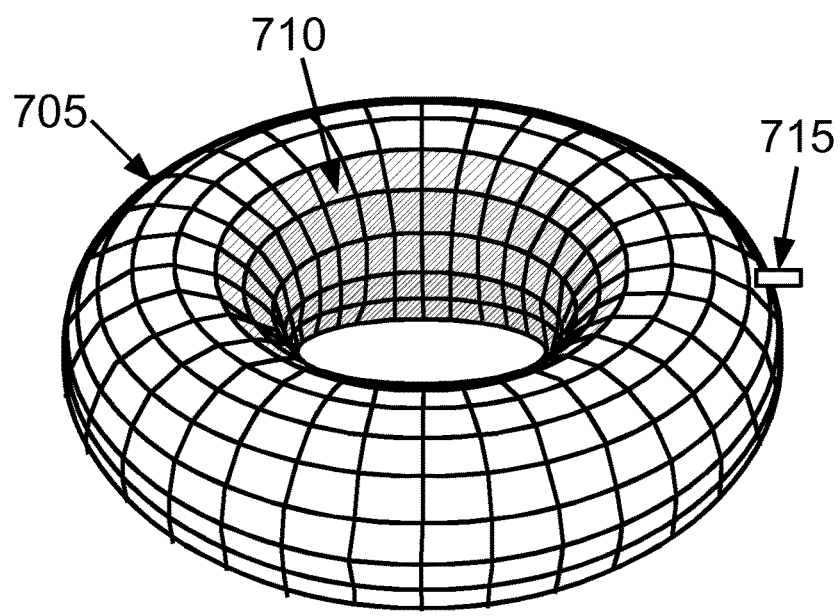
FIG. 7 shows another embodiment of an Lower Chamber (700). In this embodiment, the Lower Chamber (700) models a torus comprising an outer surface (705), an at least partially open inner chamber (710) and at least one gas passage nozzle (715).

FIG. 7 shows another embodiment of an Lower Chamber (700). In this embodiment, the Lower Chamber (700) models a torus comprising an outer surface (705), an at least partially open inner chamber (710) and at least one gas passage nozzle (715).

As with the embodiment in FIG. 6. this embodiment of the Lower Chamber (600) presents certain advantages in that the toroid shape, when deflated, folds into a smaller size than some other shapes.

In this embodiment, the Lower Chamber (700) is deeper for cradling larger food container and provides a base for the Inflatable Upper Chamber as well. In some embodiments, the outer surface (705) may be a polyester film, including that sold under the Mylar® brand. In other embodiments, the outer surface (705) might be polyvinyl chloride (PVC) film.

In some embodiments, the outer surface (705) may be clear. In some embodiments, the outer surface (705) may be reflective polyester film or reflective polyvinyl chloride (PVC) film In other embodiments, the reflective inner surface might be aluminum metalized coating. If reflective, the Lower Chamber (700) would assist in heating the food or beverage within the Inflatable Light Weight Solar Cooker.

The at least partially open inner chamber (710) may be small or large as designed to accommodate whatever cooking container is used, if one is used. In some embodiments, the at least partially open inner chamber (710) may have a sealed bottom so that a flexible cooking container, perhaps made of a flexible plastic, such as a polyethylene bag, or even a paper bag, may be placed on the at least partially open inner chamber (710) for heating and cooking.

The at least one gas passage nozzle (715) is a port for the passage of a transparent gas into, out of, or into and out of the Lower Chamber (700) so the Lower Chamber (700) may be inflated, deflated, or inflated and deflated. In some embodiments, there may be one gas passage nozzle (715). Other embodiments may have a plurality of gas passage nozzles (715).

The at least one gas passage nozzle (715) is flexible in some embodiments so that all structures of the Lower Chamber (700) might be made of the same material.

The at least one gas passage nozzle (715) is flexible in some embodiments so that the Lower Chamber (700) might be deflated and compressed for storage and not risking damage, which might occur if the at least one gas passage nozzle (715) were a non-flexible material.

Figure 8:
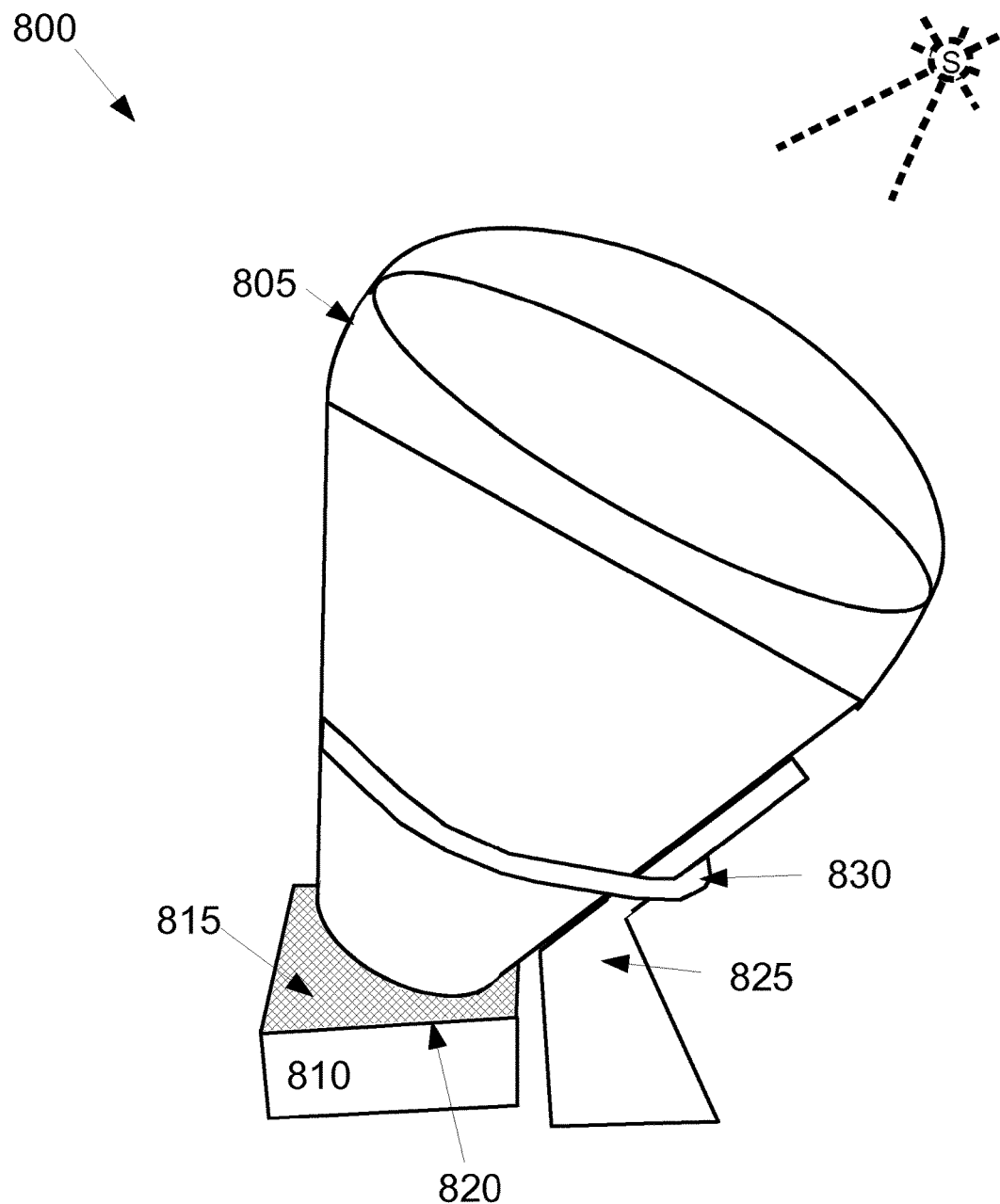
FIG. 8 shows an embodiment of an Inflatable Light Weight Solar Cooker (800) with an Inflatable Upper Chamber (805) having an inner reflective surface as previously described, a Lower Chamber (810) with reflective inner surface (815), a Lower Chamber transparent cover (820), a supporting stand (825) and supporting strap (830).

FIG. 8 shows an embodiment of an Inflatable Light Weight Solar Cooker (800) with an Inflatable Upper Chamber (805) having an inner reflective surface as previously described, a Lower Chamber (810) with reflective inner surface (815), a Lower Chamber transparent cover (820), a supporting stand (825) and supporting strap (830).

The Lower Chamber (810) is similar to other embodiments. The distinction of Inflatable Light Weight Solar Cooker (800) is that the Lower Chamber (810) with reflective inner surface (815) is typically not inflatable.

In some embodiments, the Lower Chamber (810) with reflective inner surface (815) may include a Lower Chamber transparent cover (820) for trapping heated air within the Lower Chamber (810) with reflective inner surface (815). In some embodiments, the Lower Chamber transparent cover (820) may be clear polyester film, including that sold under the Mylar® brand. In some embodiments, the Lower Chamber (810) may be integrated with the cooking chamber. In some embodiments, the Lower Chamber transparent cover (820) may be polyethylene (PE) film or polyethylene terephthalate film.

Another distinction of the Inflatable Light Weight Solar Cooker (800) is that a supporting stand (825) may be present. Supporting stand (825) aids in keeping Inflatable Upper Chamber (805) pointed at the Sun (S) without assistance. As Inflatable Upper Chamber (805) is lightweight, supporting stand (825) does not have to support much weight. In some embodiments, supporting stand (825) may be comprise polyvinyl tubing, which is beneficial in being lightweight, inexpensive, easy to cut to size, and easy to assemble with off-the shelf supplies.

Another distinction of the Inflatable Light Weight Solar Cooker (800) is that a supporting strap (830) may be present. As with the supporting stand (825), the supporting strap (830) aids in keeping Inflatable Upper Chamber (805) pointed at the Sun (S) without assistance. Similarly, supporting strap (830) may be made from lightweight, off the shelf materials, even bungee cords.

Figure 9:
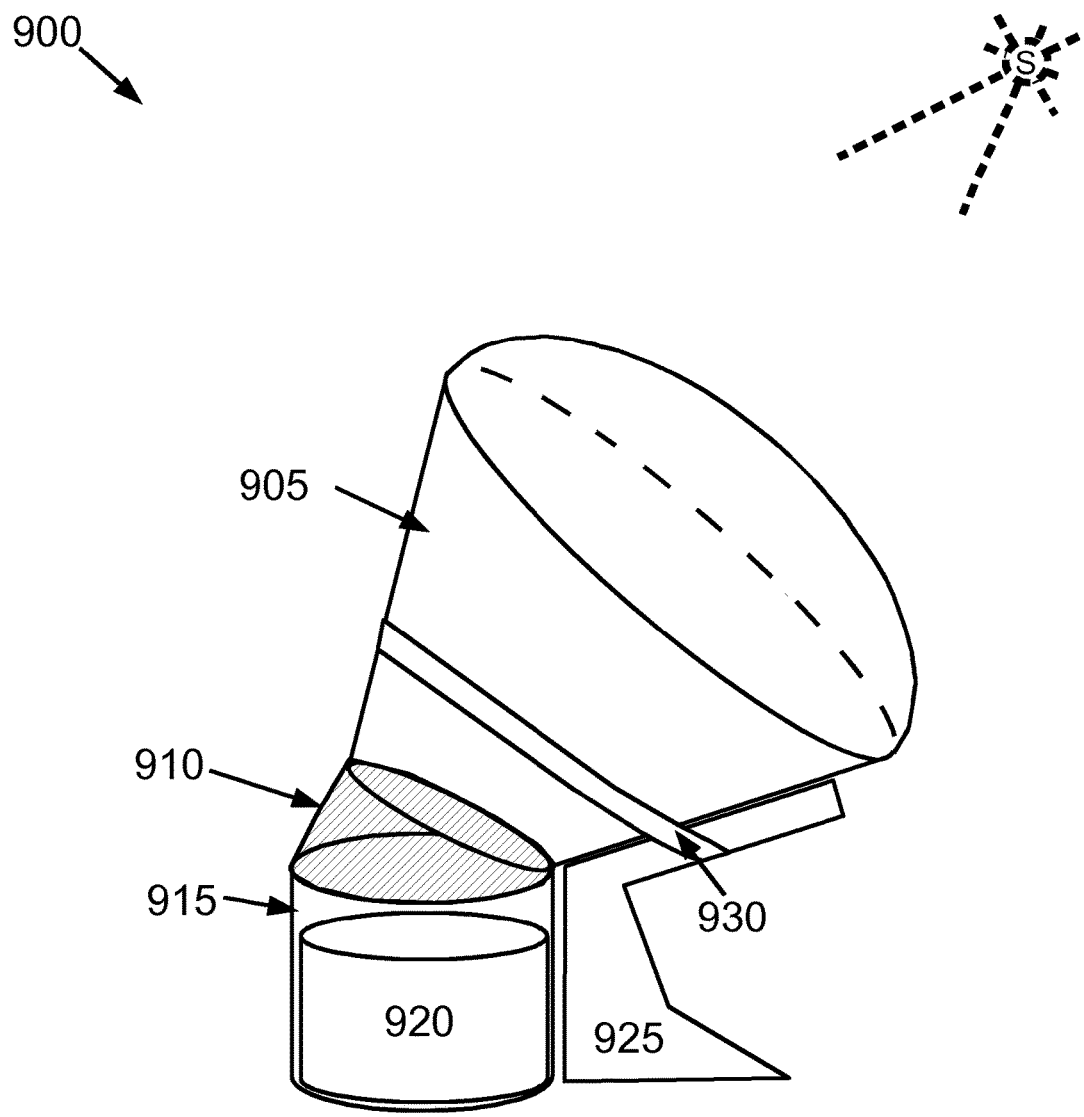
FIG. 9 shows an embodiment of an Inflatable Light Weight Solar Cooker (900) with an Inflatable Upper Chamber (905) having an inner reflective surface as previously described, a cowling with inner reflective surface (910), a Lower Chamber (915), a cooking chamber (920), a supporting stand (925) and a supporting strap (930).

FIG. 9 shows an embodiment of an Inflatable Light Weight Solar Cooker (900) with an Inflatable Upper Chamber (905) having an inner reflective surface as previously described, a Cowling with inner reflective surface (910), a Lower Chamber (915), a cooking chamber (920), a supporting stand (925) and a supporting strap (930).

The Inflatable Light Weight Solar Cooker (900) is similar to other embodiments of the Inflatable Light Weight Solar Cooker, with the exception of the Cowling with inner reflective surface (910). In other embodiments, the Inflatable Upper Chamber of the Inflatable Light Weight Solar Cooker is typically resting on or within the Lower Chamber (915). If the Lower Chamber is open, i.e., without a transparent cover, heat may escape, while debris and contaminants may enter the Cooking Chamber (920). The Cowling with inner reflective surface (910) aids in both trapping heat in, and blocking debris and contaminants from entering the cooking chamber (920). The Cowling with inner reflective surface (910) is also helpful when the Sun (S) is low in the sky with the Cowling with inner reflective surface (910) reflecting concentrated light from the Inflatable Upper Chamber (905) into the Lower Chamber (915). In some embodiments, the Cowling with inner reflective surface (910) may be flexible. In some embodiments, the Cowling with inner reflective surface (910) may be integrated with the Lower Chamber (915).

Figure 10:
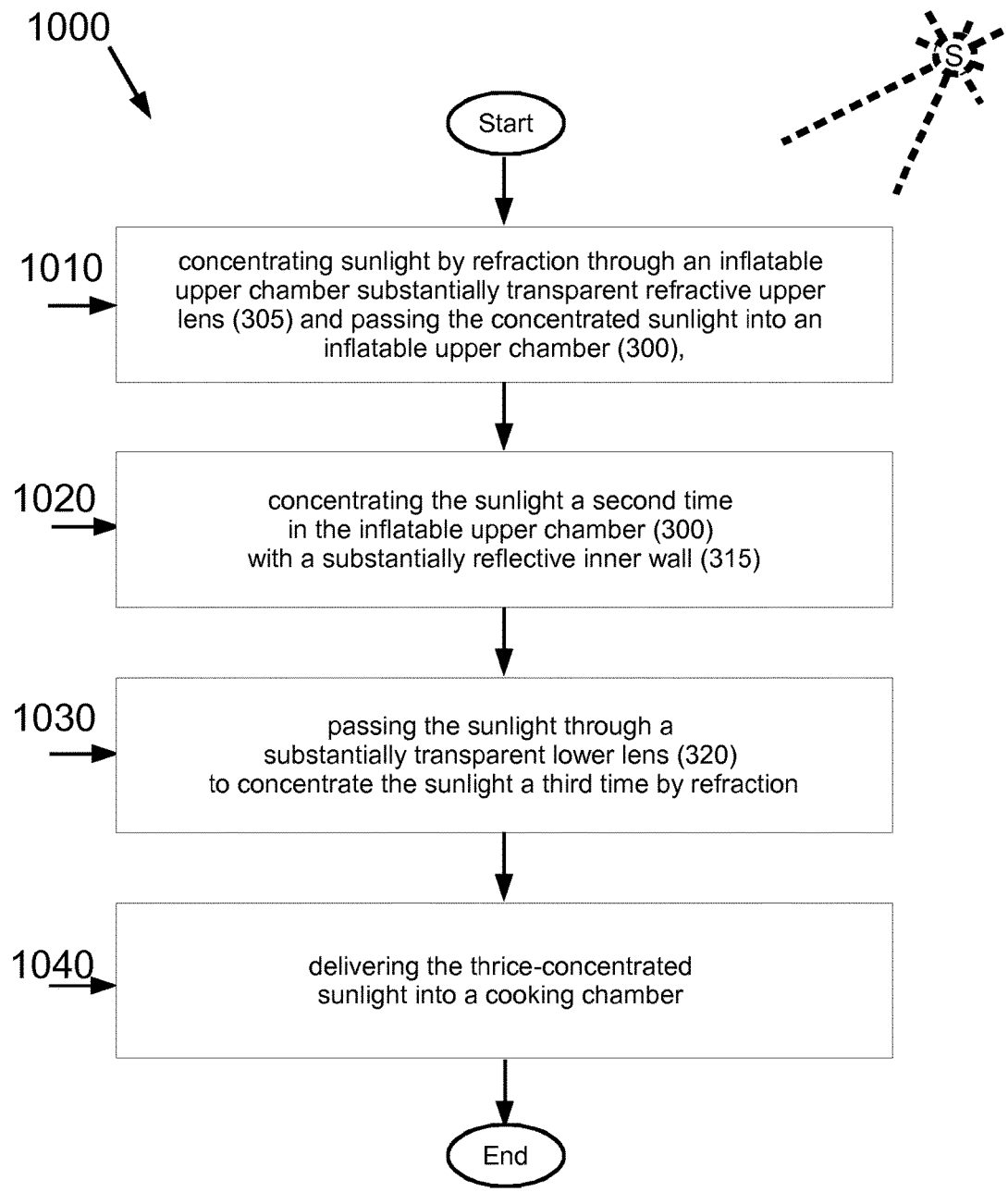
FIG. 10 shows a method for delivering thrice-concentrated sunlight into a cooking chamber.

FIG. 10 shows a method for delivering thrice-concentrated sunlight into a cooking chamber. The method (1000) comprises:

Step 1010: concentrating sunlight by refraction through an inflatable upper chamber substantially transparent refractive upper lens (305) and passing the concentrated sunlight into an Inflatable Upper Chamber (300), Step 1020: concentrating the sunlight a second time in the Inflatable Upper Chamber (300) with a substantially reflective inner wall (315), Step 1030: passing the sunlight through a substantially transparent lower lens (320) to concentrate the sunlight a third time by refraction, and Step 1040: delivering the thrice-concentrated sunlight into a cooking chamber.

These descriptions and drawings are embodiments and teachings of the disclosure. All variations are within the spirit and scope of the disclosure. This disclosure is not to be considered as limiting the claims to only the embodiments illustrated or discussed. Certain changes can be made in the subject matter without departing from the spirit and the scope of this invention. It is realized that changes are possible within the scope of this invention and it is further intended that each structure or element recited in any of the claims is to be understood as referring to all equivalent structure or elements. The following claims are intended to cover the invention as broadly as possible in whatever form it may be used.

What is claimed is:

1. An inflatable light weight solar cooker comprising an inflatable upper chamber which comprises an inflatable upper chamber substantially transparent refractive upper lens, a substantially conical outer wall, a substantially reflective inner wall, a substantially transparent lower lens, and at least one gas passage nozzle, and is capable of allowing sunlight to pass into a lower chamber which is capable of allowing sunlight to pass into a cooking chamber.

2. The inflatable light weight solar cooker of claim 1 wherein the inflatable upper chamber substantially transparent refractive upper lens comprises a flexible material selected from the group consisting of polyester film, polyvinyl film, polyethylene film, and polyethylene terephthalate film.

3. The inflatable light weight solar cooker of claim 1 wherein the substantially conical outer wall comprises a flexible material selected from the group consisting of polyester film, polyvinyl film, polyethylene film, and polyethylene terephthalate film.

4. The inflatable light weight solar cooker of claim 1 wherein the substantially reflective inner wall comprises a flexible material selected from the group consisting of reflective polyester film, reflective polyvinyl film, and aluminized coating on a flexible substrate.

5. The inflatable light weight solar cooker of claim 1 wherein the substantially transparent lower lens comprises a flexible material selected from the group consisting of polyester film, polyvinyl film, polyethylene film and polyethylene terephthalate film.

6. The inflatable light weight solar cooker of claim 1 wherein the least one gas passage nozzle is flexible.

7. The inflatable light weight solar cooker of claim 1 wherein inflatable upper chamber has an inflatable upper chamber solar radiation entrance width ('a'), and an inflatable upper chamber solar radiation exit width ('b'), wherein the inflatable upper chamber solar radiation entrance width ('a') is less than three times the inflatable upper chamber solar radiation exit width ('b').

8. The inflatable light weight solar cooker of claim 1 wherein the lower chamber comprises an inflatable outer wall, a inner chamber and at least one gas passage nozzle and has a substantially cylindrical shape.

9. The inflatable light weight solar cooker of claim 1 further comprising a lower chamber transparent cover adjacently between the inflatable upper chamber and the lower chamber.

10. The inflatable light weight solar cooker of claim 1 wherein the lower chamber is inflatable and comprises an outer surface, an at least partially open inner chamber and at least one gas passage nozzle and has a semi-circular toroidal shape.

11. The inflatable light weight solar cooker claim 10 wherein the outer surface is reflective.

12. The inflatable light weight solar cooker claim 1 wherein the lower chamber is inflatable and comprises an outer surface, an at least partially open inner chamber and at least one gas passage nozzle and has a toroidal shape.

13. The inflatable light weight solar cooker claim 1 further comprising a supporting stand adjacent to the inflatable upper chamber for providing stability of the inflatable upper chamber with regard to the lower chamber.

14. The inflatable light weight solar cooker claim 1 further comprising a supporting strap affixing a supporting stand to the inflatable upper chamber.

15. The inflatable light weight solar cooker of claim 1 further comprising a cowling with inner reflective surface adjacently between the inflatable upper chamber and the lower chamber.

16. A method of delivering thrice-concentrated sunlight into a cooking chamber comprising:
- concentrating sunlight by refraction through an inflatable upper chamber substantially transparent refractive upper lens and passing the concentrated sunlight into an inflatable upper chamber,
- concentrating the sunlight a second time in the inflatable upper chamber with a substantially conical outer wall and a substantially reflective inner wall,
- passing the sunlight through a substantially transparent lower lens to concentrate the sunlight a third time by refraction, and
- delivering the thrice-concentrated sunlight into a cooking chamber.

* * * * *